United States Patent
Kullin et al.

(10) Patent No.: US 6,688,774 B2
(45) Date of Patent: Feb. 10, 2004

(54) MOUNTING MEANS

(75) Inventors: Jonas Kullin, Landvetter (SE); Sven Göthberg, Västra Frölunda (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 10/167,080

(22) Filed: Jun. 12, 2002

(65) Prior Publication Data

US 2003/0007708 A1 Jan. 9, 2003

(51) Int. Cl.⁷ ............................................. F16C 43/04
(52) U.S. Cl. ...................... 384/539; 384/561; 384/584; 29/898.07
(58) Field of Search ................................ 384/510, 517, 384/537, 539, 558, 559, 561, 563, 584, 585; 29/898.07

(56) References Cited

U.S. PATENT DOCUMENTS

| | | | |
|---|---|---|---|
| 5,971,621 A | * 10/1999 | Oyafuso et al. | ............ 384/539 |
| 6,367,979 B1 | * 4/2002 | Ruoff et al. | ................. 384/517 |
| 6,502,995 B1 | * 1/2003 | Ozsoylu | ..................... 384/496 |

\* cited by examiner

*Primary Examiner*—Thomas R. Hannon
(74) *Attorney, Agent, or Firm*—Burns, Doane, Swecker & Mathis, LLP

(57) ABSTRACT

A mounting device in the form of a substantially annular washer allows a bearing having relatively movable bearing rings to be blind mounted in a bearing seat in a housing or on a shaft. The washer is fitted to one of the bearing rings and abuts a side face of the other bearing ring to transfer an axial mounting force between the two bearing rings to mount one of the bearing rings in the bearing seat. The washer is tapering and assumes a first stable position to transfer axial force sufficient to push one of the bearing rings into its seat and an unstable region encountered after the one bearing ring has reached its mounted position. Under continued axial force, the washer flexes away from the side face of the other bearing ring to an inverted tapering, second stable position, with a passage between the bearing rings being opened.

14 Claims, 1 Drawing Sheet

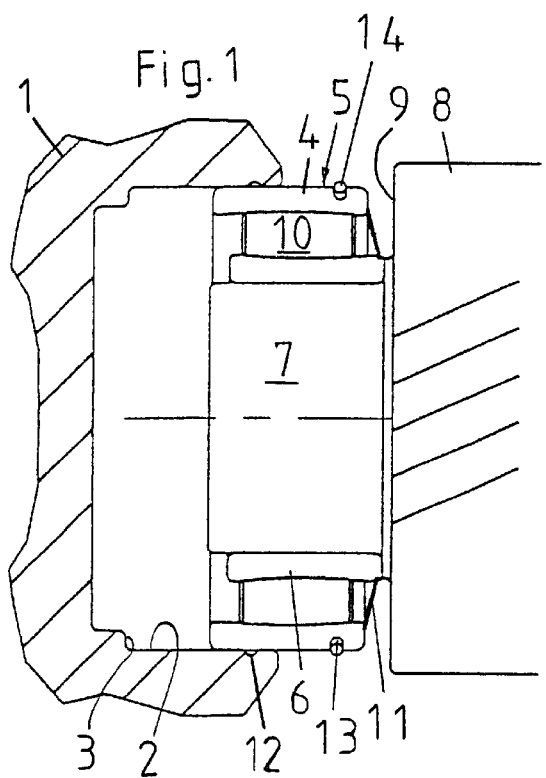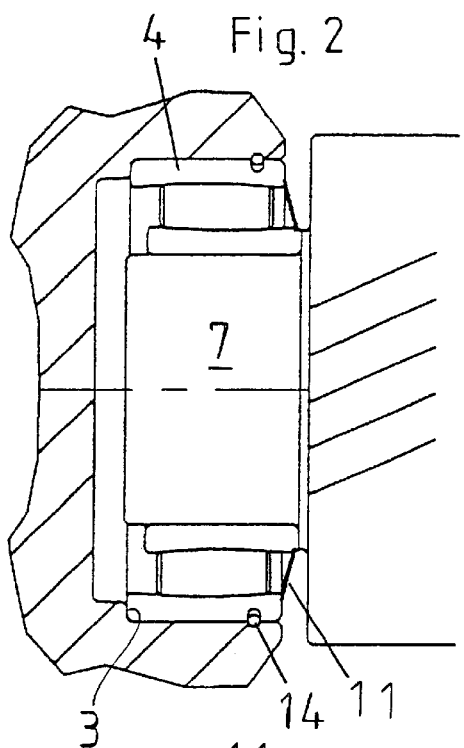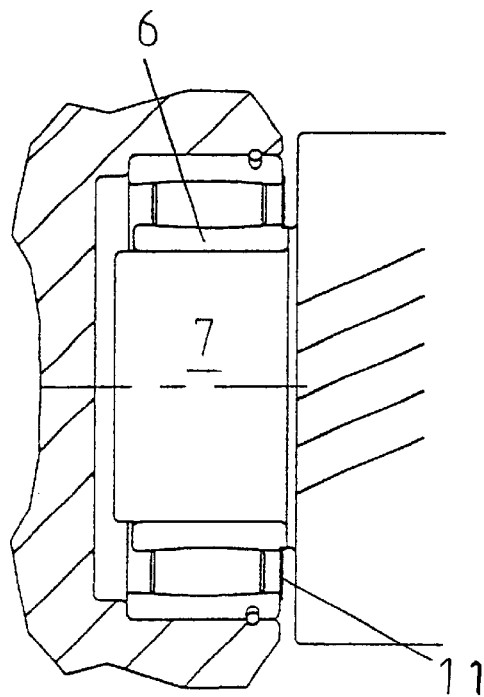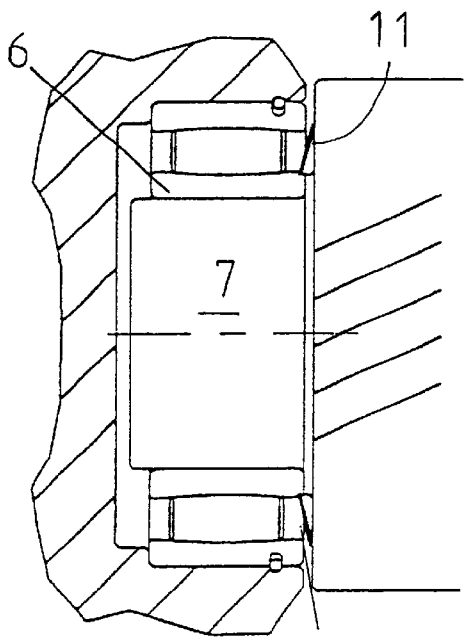

MOUNTING MEANS

This application is based on and claims priority under 35 U.S.C. §119 with respect to Swedish Application No. 0102081-7 filed on Jun. 12, 2001, the entire content of which is incorporated herein by reference.

FIELD OF THE INVENTION

The present invention generally refers to a mounting arrangement for mounting a bearing. More particularly, the invention pertains to a mounting arrangement having particularly useful application for blind mounting a bearing of the type where the bearing rings are axially movable relative to each other.

BACKGROUND OF THE INVENTION

When mounting bearings, having axially movable bearing rings, in a blind manner (i.e., where the outer race ring of the bearing shall be mounted in a bearing seat which is not accessible), often the inner race ring with a set of rolling bodies is arranged on a shaft end integral with an adjacent shaft portion of at least the same diameter as the bearing seat diameter. This means that it is difficult to control the mounting displacement for both race rings so as to be sure that both race rings have been positioned in the bearing seat and on the shaft in the correct initial positions.

Such a mounting can be required, for example in a gear box, where a shaft is to be mounted in such a concealed manner, with the shaft, for example, being supported in a toroidal roller bearing, or in another type of axially displaceable bearing. The invention described here is not limited to use in such an application, but rather can be applied in a variety of different applications where similar or related difficulties may exist.

SUMMARY OF THE INVENTION

The mounting arrangement described here is designed to ascertain that the outer race ring of the bearing is positioned correctly during the mounting operation, and in such a manner that the shaft is not prevented from expanding following temperature increase and also so that lubricating oil can enter the bearing.

According to one aspect of the invention, a bearing mounting arrangement includes a housing having a bearing seat, two bearing rings movable relative to each other, and an annular washer fitted to one of the two bearing rings and adapted to abut a side face of the other bearing ring during mounting to transfer an axial mounting force between the two bearing rings to mount one of the bearing rings in the bearing seat. The washer is tapered and is arranged to achieve a first stable position in which the washer transfers an axial force sufficient to push the one bearing ring into a mounted position in the bearing seat, to achieve an unstable position encountered after the one bearing ring has reached the mounted position in the bearing seat, and under influence of continued axial force is adapted to flex to an inverted second stable position in which the washer flexes away from the side face of the other bearing ring to open a passage between the bearing rings in an operating position of the bearing.

According to another aspect, a bearing mounting arrangement for blind mounting a bearing includes a housing having a bearing seat, a shaft having an end portion positioned in the housing, and the bearing comprising an inner bearing ring mounted on the shaft, an outer bearing ring movable relative to the inner bearing ring, and a plurality of rolling bodies positioned between the inner and outer bearing rings. An annular washer is mounted on the inner bearing ring at an inner periphery of the washer and abuts against a side face of the shaft in an operating position of the bearing so that an open passage exists between the inner and outer bearing rings in an operating position of the bearing. The washer is adapted to transfer an axial mounting force from the inner bearing ring to the outer bearing ring during mounting of the bearing in the bearing seat by moving from a first stable position in which an outer periphery of the washer engages a side face of the outer bearing ring to transfer an axial force sufficient to push the outer bearing ring into a mounted position in the bearing seat, to an unstable intermediate position, and to a second stable position in which the washer flexes away from the side face of the outer bearing ring to a second stable position inverted with respect to the first stable position.

Another aspect involves a method of blind mounting a bearing in a bearing seat of a housing or on a shaft, wherein the bearing includes two bearing rings movable with respect to each other and a plurality of rolling elements between the two bearing rings, and including a washer abutting a side face of one of the bearing rings. The method involves applying an axial force between the two bearing rings with the washer being arranged in a first position to transfer the axial mounting force to the one bearing ring to position the one bearing ring in a mounted position in the bearing seat or on a shaft. The axial force continues to be applied to move the other bearing ring with respect to the one bearing ring in its mounted position to cause the washer to flex to a second position inverted with respect to the first position so that the washer flexes away from the side face of the one bearing, with a passage being opened between the two bearing rings.

BRIEF DESCRIPTION OF THE DRAWING FIGURES

The foregoing and additional features and characteristics of an embodiment of the present invention will become more apparent from the following detailed description considered with reference to the accompanying drawing figures in which like reference numerals designate like elements.

FIG. 1 is a schematic illustration partly in cross-section of a roller bearing arranged on a shaft and illustrating one part of the mounting sequence for a bearing to be mounted in a concealed manner in a bearing seat using the mounting arrangement disclosed here.

FIG. 2 is a schematic illustration similar to FIG. 1 illustrating another part of the mounting sequence for a bearing to be mounted in a concealed manner in a bearing seat using the mounting arrangement disclosed here.

FIG. 3 is a schematic illustration similar to FIG. 1 illustrating another part of the mounting sequence for a bearing to be mounted in a concealed manner in a bearing seat using the mounting arrangement disclosed here.

FIG. 4 is a schematic illustration similar to FIG. 1 illustrating a further part of the mounting sequence for a bearing to be mounted in a concealed manner in a bearing seat using the mounting arrangement disclosed here.

FIG. 5 is a cross-sectional view of the mounting arrangement used in the mounting sequence illustrated in FIGS. 1–4.

DETAILED DESCRIPTION OF THE INVENTION

FIG. 1 schematically illustrates, partly in cross-section, a part 1 of a machine member forming a housing for the bearing and which can be, for example, a housing wall of a gear box or the like. A cylindrical recess 2 is provided in the machine member or housing 1 and forms a bearing seat for a bearing 5. In the illustrated example, the bearing 5 includes an outer race ring 4 and an inner race ring 6. The recess 2 in the machine member 1 has a shoulder 3 against which one side face of the outer race ring 4 of the bearing 5 is adapted to engage in a mounted condition of the bearing.

The inner race ring 6 of the bearing 5 is arranged on a shaft journal 7. This shaft journal 7 is integral with a shaft or drum portion 8 having a larger outer diameter than the outer diameter of the shaft journal 7 to thereby form a shoulder 9 facing the inner race ring 6 of the bearing 5. In the illustrated embodiment, the size of this shoulder 9 is such that it extends also over the position of the outer race ring 4 of the bearing when the outer race ring 4 is positioned over the inner race ring 6 and spaced apart from the inner race ring 6 by the rolling bodies 10. Due to the design of the bearing 5, for example a toroidal bearing, the outer race ring 4 and the rollers 10 are axially movable in relation to each other and to the inner race ring 6, and in the case of a toroidal bearing, they are also angularly movable relative to each other.

It is thus not possible to push the outer race ring 4 into the bearing seat 2 only by transfer of the movement of the inner race ring 6 on the shaft journal 7 by the intermediary of the rollers 10 because the outer race ring 4 will move axially and angularly in relation to the inner race ring 6. To allow the outer race ring 4 to be pushed in by the movement of the shaft 7 and through contact with the shoulder 9, a kind of washer is used as a mounting arrangement or mounting device.

This washer must span the distance between the shaft journal 7 or the inner race ring 6 and the side face of the outer ring 4. With such a wide washer, the space between the side face of the outer race ring 4 and the shoulder 9 of the shaft portion 8 is bridged, thereby preventing axial movement of the shaft 7, 8 which might otherwise occur due to increased temperature in the shaft, and which might cause undue stresses in the assembly. In addition, by covering the slot between the outer race ring 4 and the side face of the shoulder 9 of the shaft, the unrestricted flow of oil into and out of the bearing would be obstructed, leading to lubricant starvation and possible early breakdown of the bearing.

In light of these concerns, a cup-spring shaped annular washer 11 having an inner bore is employed here. In the embodiment illustrated in FIGS. 1–4, this washer 11 is fitted at its inner bore periphery to the inner race ring 6 of the bearing, although the same effect can be achieved if the washer 11 is fitted with its outer periphery to the outer race ring 4 of the bearing.

In the illustrated embodiment, the recess or bearing seat 2 is provided with an inner circumferential groove 12. That is, the inner surface of the recess 2 is provided with an annular circumferential groove 12. In addition, the outer bearing ring 4 has an external circumferential groove 13 in which is positioned a locking ring 14. That is, the outer surface of the outer race ring 4 is provided with an annular circumferential groove 13. The grooves 12, 13 are positioned at the same axial distance from the shoulder 3 and from the side face of the ring 4 when the ring 4 abuts the shoulder 3 in the mounted position.

FIG. 1 illustrates one step in the mounting sequence in which the bearing rings 4, 6 are axially displaced relative to one another by the washer 11 and the outer ring 4 has begun being pushed into the recess 2 in the housing 1. The washer 11 is thus in a first stable position in which it is able to transfer to the outer bearing ring 4 an axial pushing force applied to the shaft journal 7.

FIG. 2 shows another step in the mounting sequence in which the outer bearing ring 4 has reached its final position in the bearing seat 2, abutting the shoulder 3. In this position, the locking ring 14 has entered into the groove 12 in the bearing seat 2, thereby axially arresting the ring 4 in this position. In this position, the washer 11 has left or moved from its first stable position and has reached an unstable region or position in which it has started to flatten out, although the bearing rings 4, 6 are still axially displaced relative to each other.

FIG. 3 a further part of the mounting sequence in which the shaft journal 7 has been pushed further in axial direction, thereby displacing only the inner bearing ring or race ring 6, because the outer bearing ring 4 is in engagement with the shoulder 3. The cup-spring shaped washer 11 is thus still in its unstable region or position in which it is however balanced between the pushing force and the resistance to displacement from the bearing ring. The washer 11 has here been completely flattened out and has reached a position where it can flex in either direction. In this position, the space between the bearing rings or race rings 4, 6 is still covered by the washer 11.

FIG. 4 illustrates the position of the components in the operating position of the bearing. Here the shaft journal 7 has been pushed axially a little bit further from the position shown in FIG. 3. In the position shown in FIG. 4, the inner race ring 6 is aligned with the outer race ring 4. At the same time, the washer 11 has been pushed beyond its unstable region into a second stable position. In this second stable position, the washer 11 is inverted from its position at the beginning of the mounting sequence. In the illustrated embodiment, the outer edge of the washer 11 has flexed away from its engagement with the side face of the outer bearing ring 4, whereby a passage 15 allowing relatively free oil flow into the bearing has been created. FIG. 4 shows the bearing in its operating state or operating position. In the illustrated and described embodiment, the outer periphery of the washer engages the side face of the shoulder 9 of the shaft in the operating position of the bearing.

FIG. 5 is a cross-section through a thin, cup-spring shaped washer 11 representing the mounting device according to the described and illustrated embodiment of the present invention. The washer 11 is tapered at its outer periphery and possesses a "flip-flop" function which allows the washer to transfer an axial pushing force between the two race rings of the bearing until a certain force is applied upon it, whereby the washer will flex to an inverted shape such as shown in the drawing figures and described above by way of example. The washer 11 is thus designed to be thin enough to have two spaced apart stable positions or regions, and an intermediate unstable region or position. The thickness of the spring washer 11 can be chosen in dependence on the diametrical measurements of the washer. To obtain the desired effect, it has been found that a thickness of 0.3 mm is appropriate for a washer having an outer diameter of 47.5 mm and an inner diameter of 33.3 mm, and with a distance between the inner and outer rim of 2.3 mm in a neutral position. Spring steel has been found to be a suitable material for fabricating the washer 11.

It is apparent that the mounting device used in the embodiment of the mounting arrangement described and illustrated above provides a mechanism for blind mounting an axially displaceable bearing in a simple and reliable manner. At the same time, the mounting device also produces an open passage 15 between the bearing race rings when the mounting operation or sequence is completed. Further, the washer 11 can prevent the rollers 10 from falling out of the bearing when this is stored and handled prior to mounting.

The invention is not limited to the particular embodiment and details described above and shown in the drawing figures. For example, the mounting arrangement has been shown with circumferential grooves in the housing and on the bearing ring for receiving a locking ring. Such an arresting arrangement is not necessary.

The principles, preferred embodiment and mode of operation of the present invention have been described in the foregoing specification. However, the invention which is intended to be protected is not to be construed as limited to the particular embodiment disclosed. Further, the embodiment described is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A bearing mounting arrangement comprising:

a housing having a bearing seat;

two bearing rings movable relative to each other;

an annular washer fitted to one of the two bearing rings and adapted to abut a side face of the other bearing ring during mounting to transfer an axial mounting force between the two bearing rings to mount one of the bearing rings in the bearing seat; and the washer being tapered and being arranged to achieve a first stable position in which the washer transfers an axial force sufficient to push the one bearing ring into a mounted position in the bearing seat, to achieve an unstable position encountered after the one bearing ring has reached the mounted position in the bearing seat, and under influence of continued axial force is adapted to flex to an inverted second stable position in which the washer flexes away from the side face of the other bearing ring to open a passage between the bearing rings in an operating position of the bearing.

2. The mounting arrangement according to claim 1, wherein the washer is a cup-spring, having an inner peripheral edge and an outer peripheral edge, one of the peripheral edges being fitted to the one bearing ring and the other peripheral edge of the washer loosely engaging the side face of the other bearing ring during mounting and until the bearing is in its operating position.

3. The mounting arrangement according to claim 1, wherein the one bearing ring is an inner bearing ring and the other bearing ring is an outer bearing ring.

4. The mounting arrangement according to claim 1, including rolling bodies positioned between the two bearing rings.

5. A bearing mounting arrangement for blind mounting a bearing comprising:

a housing having a bearing seat;

a shaft having an end portion positioned in the housing;

the bearing comprising an inner bearing ring mounted on the shaft, an outer bearing ring movable relative to the inner bearing ring, and a plurality of rolling bodies positioned between the inner and outer bearing rings;

an annular washer mounted on the inner bearing ring at an inner periphery of the washer and abutting against a side face of the shaft in an operating position of the bearing so that an open passage exists between the inner and outer bearing rings in an operating position of the bearing; and the washer being adapted to transfer an axial mounting force from the inner bearing ring to the outer bearing ring during mounting of the bearing in the bearing seat by moving from a first stable position in which an outer periphery of the washer engages a side face of the outer bearing ring to transfer an axial force sufficient to push the outer bearing ring into a mounted position in the bearing seat, to an unstable intermediate position, and to a second stable position in which the washer flexes away from the side face of the outer bearing ring to a second stable position inverted with respect to the first stable position.

6. The mounting arrangement according to claim 5, wherein the washer is a cup-spring.

7. The mounting arrangement according to claim 5, wherein an inner surface of the bearing seat includes a groove and an outer surface of the outer bearing ring includes a groove, and including a locking ring engaging the groove in the inner surface of the bearing seat and the groove in the outer surface of the outer bearing ring.

8. A method of blind mounting a bearing in a bearing seat of a housing or on a shaft, the bearing comprising two bearing rings movable with respect to each other and a plurality of rolling elements between the two bearing rings, and including a washer abutting a side face of one of the bearing rings, the method comprising:

applying an axial force between the two bearing rings with the washer being arranged in a first position to transfer the axial mounting force to the one bearing ring to position the one bearing ring in a mounted position in the bearing seat or on a shaft; and continuing to apply the axial force to move the other bearing ring with respect to the one bearing ring in its mounted position to cause the washer to flex to a second position inverted with respect to the first position so that the washer flexes away from the side face of the one bearing, with a passage being opened between the two bearing rings.

9. The method according to claim 8, wherein the one bearing ring is an outer bearing ring and the other bearing ring is an inner bearing ring, the side face of the outer bearing ring being engaged by an outer periphery of the washer when the washer is in the first position.

10. The method according to claim 8, wherein the other bearing ring is mounted on a shaft, and the axial force is applied to the shaft to mount the bearing in the bearing seat.

11. The method according to claim 8, wherein the other bearing ring is mounted on a shaft journal of a shaft, and the axial force is applied to the shaft.

12. The method according to claim 8, wherein the washer is mounted on the other bearing ring, with an outer periphery of the washer engaging the side face of the one bearing ring.

13. The method according to claim 8, wherein the first position and the second position of the washer are stable positions, the washer moving from the first stable position to an unstable position and then flexing to the second stable position.

14. The method according to claim 8, wherein the axial force causes the one bearing ring to move relative to the other bearing until the one bearing ring engages a shoulder in the mounting seat, and continued application of the axial force causes the other bearing ring to move relative to the one bearing ring until the two bearing rings are aligned with one another.

* * * * *

UNITED STATES PATENT AND TRADEMARK OFFICE
CERTIFICATE OF CORRECTION

PATENT NO. : 6,688,774 B2
DATED : February 10, 2004
INVENTOR(S) : Jonas Kullin and Sven Göthberg It is certified that error appears in the above-identified patent and that said Letters Patent is hereby corrected as shown below:

<u>Title page,</u>
Item [30], Foreign Application Priority Data, please include the following:
-- Swedish Patent Application No. 0102081-7 filed in Sweden on June 12, 2001. --

Signed and Sealed this

First Day of June, 2004

JON W. DUDAS
*Acting Director of the United States Patent and Trademark Office*